United States Patent [19]

Channing

[11] Patent Number: 4,809,834
[45] Date of Patent: Mar. 7, 1989

[54] MULTIPLE PLATE CLUTCH RELEASE PROPORTIONING DEVICE

[75] Inventor: Derek A. Channing, Livonia, Mich.

[73] Assignee: Ford Motor Company, Dearborn, Mich.

[21] Appl. No.: 90,876

[22] Filed: Aug. 31, 1987

[51] Int. Cl.$^4$ .................. F16D 13/50; F16D 13/75
[52] U.S. Cl. .................. 192/70.27; 192/70.18; 192/70.25; 192/70.26
[58] Field of Search .................. 192/48.1, 48.7, 70.16, 192/70.18, 70.19, 70.2, 70.21, 70.25, 70.26, 70.27, 70.29, 70.3

[56] References Cited

U.S. PATENT DOCUMENTS

| 2,257,877 | 10/1941 | Binder | 192/70.3 |
| 2,402,527 | 6/1946 | Baird et al. | 192/70.21 |
| 2,822,071 | 2/1958 | Hautzenroeder | 192/70.3 |
| 2,899,897 | 8/1959 | Ludwig | 192/48.7 |
| 3,174,602 | 3/1965 | Schjolin | 192/70.14 |
| 4,081,064 | 3/1978 | Smith et al. | 192/70.13 |
| 4,566,573 | 1/1986 | Lane, Jr. | 192/70.18 |
| 4,751,990 | 6/1988 | Schraut et al. | 192/70.27 |

FOREIGN PATENT DOCUMENTS

| 814390 | 9/1951 | Fed. Rep. of Germany ... 192/70.21 |
| 343449 | 9/1936 | Italy ............................. 192/70.21 |

Primary Examiner—Leslie A. Braun
Assistant Examiner—David A. Testardi
Attorney, Agent, or Firm—Donald J. Harrington; Keith L. Zerschling

[57] ABSTRACT

A multiple friction plate clutch assembly having at least one intermediate plate and a pressure plate arranged adjacent a flywheel for an internal combustion engine, a diaphragm spring actuator or lever for adjusting the pressure plate into and out of a clutch engaging position, and an index element carried by the intermediate plate which engages the diaphgram spring at a point intermediate the fulcrum point of the spring and the pressure point where the diaphragm spring or lever applies pressure to the pressure plate.

4 Claims, 3 Drawing Sheets

MULTIPLE PLATE CLUTCH RELEASE PROPORTIONING DEVICE

BACKGROUND OF THE INVENTION

My invention relates to multiple plate type clutches. Such clutches often are used in heavy-duty, manually-controlled truck transmissions, an example of which I have shown in FIGS. 1 and 2. A heavy intermediate plate is used in the construction of FIGS. 1 and 2 between two friction disc assemblies. A pressure plate is adapted to engage one of a pair of friction discs, and the force applied by that pressure plate is transferred to the intermediate plate and to the second friction disc. In an arrangement such as that shown in FIGS. 1 and 2, the reaction force of the pressure plate occurs at an annular friction surface on the flywheel of the engine, usually an internal combustion engine.

The intermediate plate typically is driven by means of lugs in the flywheel or by dogs on its margin that engage slots in the flywheel. The force of the vibrations in the internal combustion engine cause noise in the clutch assembly at low speeds due to torsional vibrations. The vibrations eventually cause wear of the drive pins, the lugs, the dogs or the drive slots that connect the intermediate plate with the flywheel.

In some prior art constructions a spring strap drive system is used for supporting and centering the intermediate plate with respect to the flywheel. The straps are situated with a generally tangential disposition with respect to the axis of the clutch so that the centerline of each strap defines a secant with respect to the outer peripheral extremities of the clutch. The use of straps may eliminate some of the noise problem caused by torsional vibrations developed by the engine, but the straps do not allow for floating movement of the intermediate plate.

The drive straps are designed also to bias the center intermediate plate to a position that will allow both friction clutch disc assemblies to rotate freely on release, but this position of the intermediate plate is of necessity a design compromise between the position that is optimum for a new clutch and the position that is optimum for a worn clutch. A worn clutch in such an arrangement would require extra travel to permit operation without frictional drag of the friction surfaces.

If the intermediate plate, which is refered to also as the drive plate, is machined during servicing following extended operation of the truck, the adjusted positions of the friction discs with respect to the clutch plates is not an optimum and friction free release of the clutch is not possible.

In other prior art constructions friction pins control the lift of the intermediate plate by using a lever system that permits a predetermined lift to release the front disc and the intermediate plate. The friction pins have a sliding resistance that exceeds the drive strap bias. The friction pins then prevent further lift of the intermediate plate. Additional clutch release travel then releases the rear disc. The friction pins are adapted to reset themselves each time the clutch is engaged as the pins respond to pressure against the flywheel. The pins thus reset for every increment of wear on the front friction disc. This system has the disadvantage of being susceptible to debris buildup on the friction pin surfaces, which can cause considerable variations in clamping load on the front disc.

BRIEF DESCRIPTION OF THE INVENTION

Drive straps are used in my improved design as in the prior art designs to connect the intermediate plate to the flywheel without requiring the use of drive lugs, slots or driving dogs. The drive straps are biased to lift the intermediate plate with a predetermined force relative to the mass of the intermediate plate.

The lift of the intermediate plate is controlled so that its movement is a fixed proportd of the main pressure plate lift by indexing it on a diaphragm spring or clutch release lever at a point between the fixed fulcrum and the main pressure contact point. As in some prior designs a diaphragm spring is used as a lever that has a fulcrum point at the outer margin of the diaphragm spring and a pressure point at a location intermediate the clutch release sleeve and the anchor point. The pin carries an indexing element that engages the diaphragm spring at a point intermediate the fulcrum point and the point on the diaphragm spring that is engaged by the pressure plate.

There usually are three or four drive straps, each of which has a similar lift force. If the clutch assembly has two friction plates, as in the design disclosed in this specification, the index point of the index element is usually located halfway between the fulcrum point of the diaphragm spring and the main pressure plate contact point.

My invention makes it possible to reduce the pressure plate load for a given torque application and to reduce also the clutch load to the same degree. Equal wear of the friction discs and the intermediate plate as well as the pressure plate will occur.

PARTICULAR DESCRIPTION OF THE INVENTION

Figure 1:
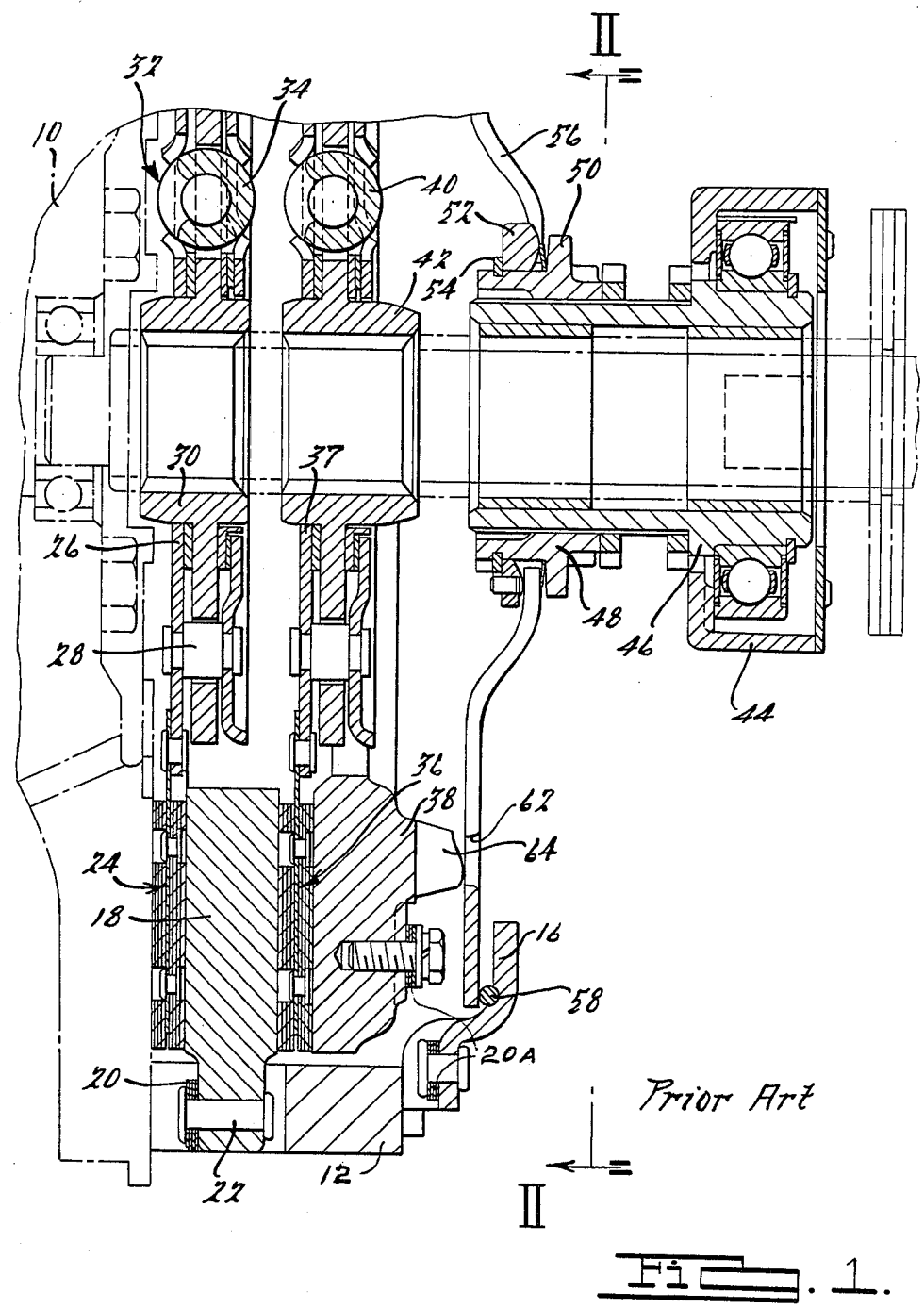
FIG. 1 is a cross-sectional view taken along the longitudinal axis of a friction clutch assembly for a prior art clutch design.

In FIG. 1 numeral 10 designates the flywheel of an internal combustion engine. A clutch spacer ring 12 is bolted by bolts 14 to the periphery of the flywheel 10. Stamped cover 16, also secured by bolts 14, together with the ring 12 forms a part of a flywheel and clutch assembly. Intermediate plate or drive plate 18 is located within the ring 12 and is supportd by straps 20. One of the ends of the straps 20 are pinned as shown at 22 to the margin of the intermediate plate or drive plate 18 and the other ends of the straps 20 are secured to the spacer ring 12. The straps 20 are made of spring steel and are formed in layers or leafs so that displacement of the intermediate plate 18 in either axial direction is accompanied by a resistance offered by the spring effect of the straps 20. Tangential driving forces are distributed between the drive plate or intermediate plate 18 and the flywheel through the straps.

A friction disc assembly 24 is located between the intermediate plate 18 and a companion friction surface on the flywheel 10. The hub 26 of the firction disc assembly 24 is connected to the hub 30 through a damper assembly 32 is known fashion. The hub 30 has arms that extend radially outward between adjacent plates of the clutch disc assembly 24. Forces are transmitted from the clutch assembly 24 through the plates 36 by means of damper springs 34.

Another friction disc assembly 36 is located between the intermediate plate 18 and a pressure plate 38. Clutch disc assembly 36, which is similar to clutch disc assembly 34, includes a radially inward portion 37 connected by means of damper assembly 40 to clutch hub 42. Spring steel straps 20A, similar to straps 20 for the intermediate plate, are used in like fashion to support the pressure plate 38 and to connect it to the clutch and flywheel assembly by means of pins through the cover 16.

Clutch hubs 30 and 42 are internally splined to receive a transmission torque input shaft which is externally splined and adapted to register with clutch hub splines. The transmission torque input shaft is not shown.

The clutch release bearing 44 has an inner race 46 that engages a bearing sleeve 48. A collar 50 is formed on sleeve 48. A thrust ring 52 surrounds the sleeve 48 and is held in place by snap ring 54.

The inner margin of diaphragm spring 56 is located between thrust ring 52 and collar 50. The peripheral margin of diaphragm spring 56 engages anchor element 58 which is held in place, as shown in FIG. 1, inside the cover 16.

A series of guide pins 60 is carried by pressure plate 38. Pins 60 extend through openings 62 in diaphragm spring 56.

A reaction fulcrum point 64 formed on the right-hand side of the pressure plate 38 engages the diaphragm spring at a point intermediate the anchor element 58 and the inner margin of the diaphragm spring. Thus when the clutch release bearing sleeve 48 is free, it is forced in a left-hand direction by the diaphragm spring; and a clutch applying force is exerted on the pressure plate 38 thus causing clutch applying pressure to be exerted on clutch disc assembly 36 and clutch disc assembly 24. This drivably connects the hubs 30 and 42 of the clutch disc assemblies to the flywheel.

When the inner margin of the clutch spring 56 moves in a right-hand direction by operation of the clutch release mechanism, clutch pressure is relieved and the friction disc assemblies 36 and 24 become released thereby interrupting the friction torque delivery the clutch disc assemblies and the intermediate plate 18.

The positioning of the intermediate plate 18 upon clutch release is effected by the spring effect of the straps 20 located at spaced angular positions on the intermediate plate 18. Similar spring straps 20A connect the pressure plate 38 to the cover 16 of the flywheel and clutch assembly. These straps can be seen in FIG. 2 as well as in FIG. 1.

Figure 2:
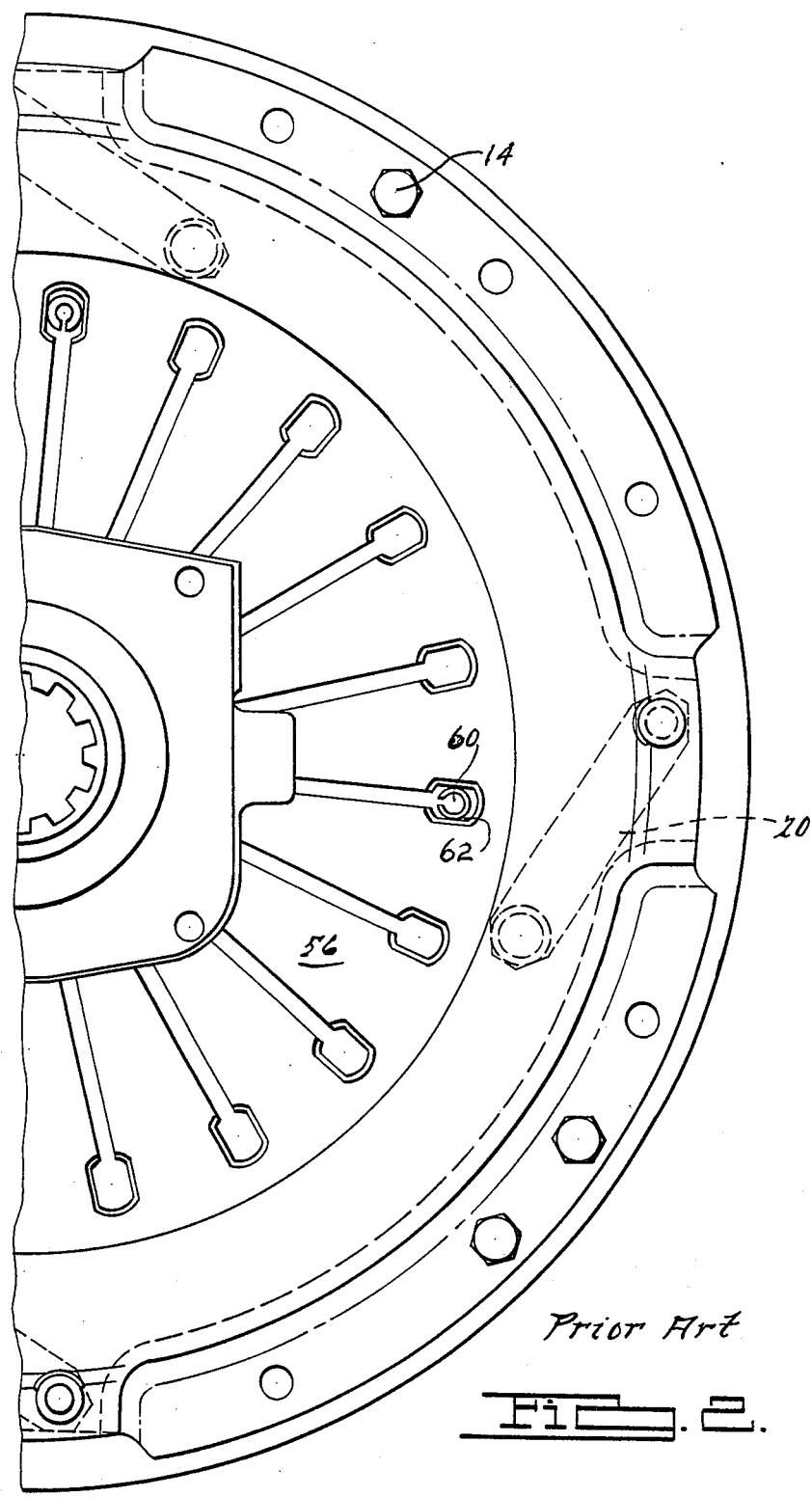
FIG. 2 is a cross-sectional view taken along the plane of section line 2—2 of FIG. 1.
Figure 3:
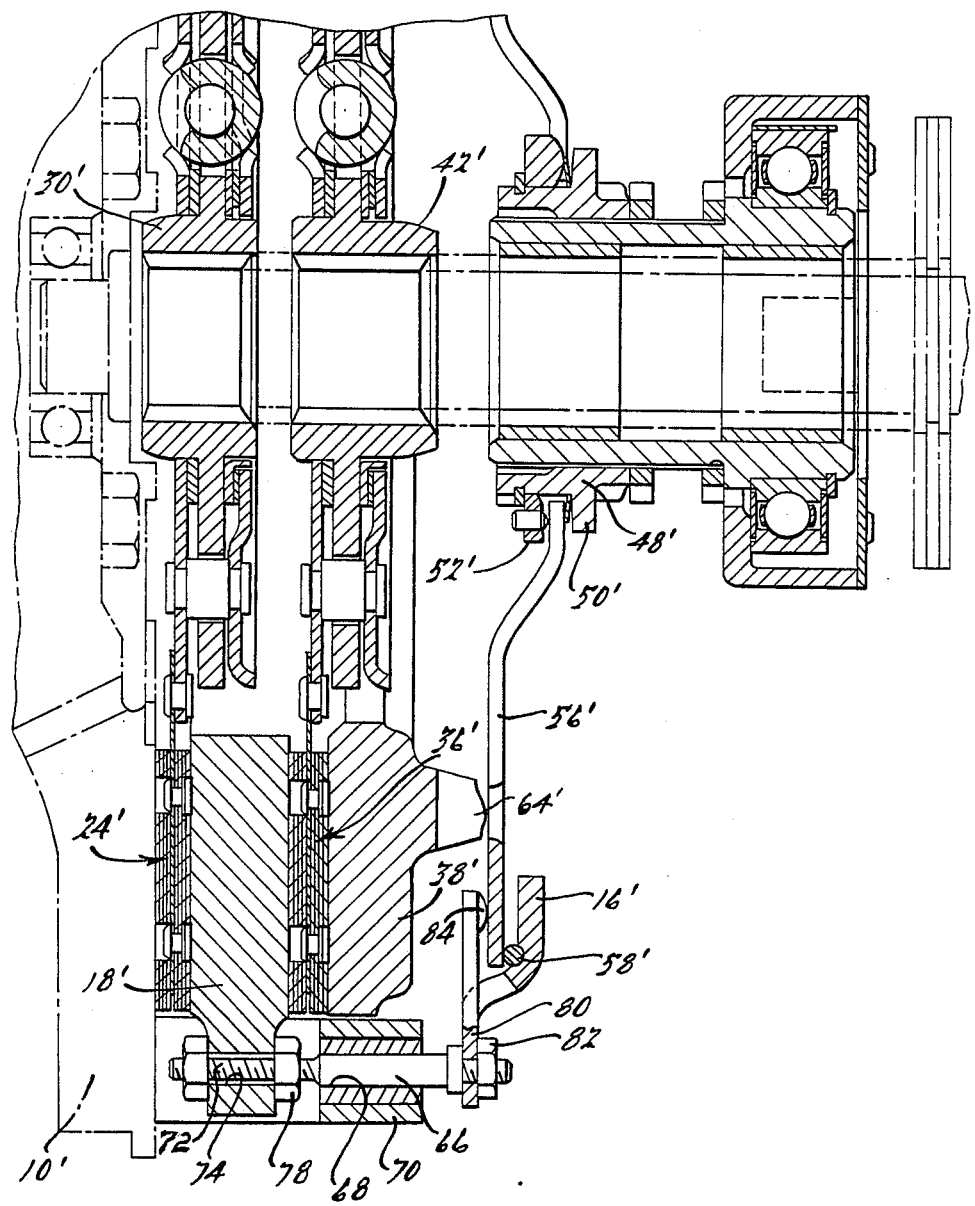
FIG. 3 is cross-sectional view similar to the cross-sectional view of FIG. 1, but it shows one embodiment of the improved assembly of my design.

My improved clutch design shown in FIG. 3 has many of the features that are illustrated in the prior art construction of FIGS. 1 and 2. For this reason elements of the FIG. 3 design that have a counterpart in the design of FIGS. 1 and 2 are designated by similar reference characters although prime notations are added.

An index pin assembly 66 extends through opening 68 in the spacer 70 of the flywheel and clutch assembly. It includes a threaded portion 72 received through opening 74 of the intermediate plate 18'. Nuts 76 and 78 secure the pin 66 in place.

The pin assembly includes an actuator element or index element 80 that extends generally radially as shown. Index element 80 is held in place on the pin assembly 66 by clamping nut 82. Several such pin assemblies are used although only one is shown in FIG. 3.

Index element 80 is in the form of a bar, and its inner margin carries a projection 84 that engages the diaphragm spring 56' at a point intermediate the point at which projection 64' engages the diaphragm spring 56' and the outer peripheral margin 58 of the diaphragm spring 56'. When two friction disc assemblies are used in the clutch assembly, projections 84 are located midway between the outer peripheral margin 58' of diaphragm spring 56' and reaction shoulder 64'. Thus when the sleeve 48'is moved, pressure plate 38' is moved a distance proportional to the distance moved by sleeve 48'. The pin assembly 66 as well as the intermediate plate 18' is moved at one-half the rate of movement of the pressure plate so that the distance travelled by the intermediate plate 18' is one-half the distance travelled by the pressure plate 38'. Thus the separation that occurs between the friction surfaces of the clutch plate assembly 24' and the friction surfaces of the clutch plate assembly 36' are precisely equal, one with respect to the other. If desired, the pin assembly may engage the adjacent spring strap or any other movable part of the clutch assembly whose axial movement is proportional to axial movement of the sleeve 48.

As wear occurs on the facings of the driven discs 24' and 36', the pressure plate 38' clamping position moves closer to the flywheel 10'. The pin assembly 66 and bar or actuator element 80 causes a load on the center drive plate 38' that causes it to adopt a position at a proportional distance toward the flywheel. When two discs are used, that proportional distance is half the total wear distance moved by the main pressure plate 38', causing equal wear on both driven discs 24' and 36'.

Having described a preferred embodiment of my invention, what I claim and desire to secure by U.S. Letters Patent is:

1. A multiple friction disc clutch and flywheel assembly for establishing a driving connection between an engine and a vehicle transmission comprising:

at least two friction disc assemblies, each having a hub adapted to be connected to a transmission input shaft and radially outward friction surfaces;

a pressure plate adjacent to one friction disc assembly, said pressure plate being connected to said flywheel assembly by torque transmitting spring elements;

an intermediate plate located between said disc assemblies, said intermediate plate also being connected to said flywheel assembly by torque transmitting spring elements;

a pin assembly connected at one end thereof to said intermediate plate and extending in an axial direction with respect to the clutch and flywheel assembly;

an actuator element forming a part of said pin assembly; the connection between said pin assembly and said intermediate plate comprising a threaded connection, whereby said pin assembly may be adjusted axially relative to said intermediate plate;

a generally radial lever actuator having an outer reaction point and an inner reaction point, one reaction point being anchored on a portion of said clutch and flywheel assembly;

a clutch apply and release bearing sleeve engageable with a radially inner end of said lever actuator;

said pressure plate being engaged by a portion of said lever actuator at a radial location thereof corresponding to one of said reaction points;

said actuator element being engageable with a portion of said clutch and flywheel assembly that is movable in proportion to axial movement of said release bearing;

said lever actuator being a diaphragm spring having an inner margin and an outer margin, said bearing sleeve engaging said inner margin, the outer margin corresponding to said outer reaction point.

2. The combination as set forth in claim 1 wherein said actuator element engages said diaphragm spring between said outer margin and the radial location on said diaphragm spring where the pressure plate engages the diaphragm spring.

3. A multiple friction disc clutch and flywheel assembly for establishing a driving connection between an engine and a vehicle transmission comprising:

at least two friction disc assemblies, each having a hub adapted to be connected to a transmission input shaft and radially outward friction surfaces;

a pressure plate adjacent to one friction disc assembly, said pressure plate being connected to said flywheel assembly by torque transmitting spring elements;

an intermediate plate located between said disc assemblies, said intermediate plate also being connected to said flywheel assembly by torque transmitting spring elements;

a pin assembly connected at one end thereof to said intermediate plate and extending in an axial direction with respect to the clutch and flywheel assembly;

an actuator element forming a part of said pin assembly; the connection between said pin assembly and said intermediate plate comprising a threaded connection, whereby said pin assembly may be adjusted axially relative to said intermediate plate;

a generally radial lever actuator having an outer reaction point and an inner reaction point, one reaction point being anchored on a portion of said clutch and flywheel assembly;

a clutch apply and release bearing sleeve engageable with a radially inner end of said lever actuator;

said pressure plate being engaged by a portion of said lever actuator at a radial location thereof corresponding to one of said reaction points;

said actuator element being engageable with a portion of said clutch and flywheel assembly that is movable in proportion to axial movement of said release bearing;

said clutch and flywheel assembly including a spacer ring and an opening extending axially through said spacer ring, said pin assembly being received in said opening and being adjustable therein when it engages said movable portion of said clutch and flywheel assembly, said pin assembly being attached to said intermediate plate whereby the intermediate plate is adjusted in proportion to wear of said friction disc assemblies, the pin assembly position relative to said pressure plate being adjustable as the pin assembly engages siad movable portion of said clutch and flywheel assembly upon wear of friction surfaces of said frictin disc assemblies, said lever actuator being a diaphragm spring having an inner margin and an outer margin, said bearing sleeve being engageable with said inner margin, the outer margin corresponding to said outer reaction point.

4. The combination as set forth in claim 3 wherein said actuator element engages said diaphragm spring between said outer margin and the radial location on said diaphragm spring where the pressure plate engages said diaphragm spring.

* * * * *